United States Patent [19]
Laville et al.

[11] Patent Number: 5,261,319
[45] Date of Patent: Nov. 16, 1993

[54] BELLOWS WITH CURVED WAVES HAVING POINTS OF CONTACT

[75] Inventors: Christian Laville, Etampes; Eric Brison, Aubergenville, both of France

[73] Assignee: EG ET G, Coignieres, France

[21] Appl. No.: 820,402

[22] Filed: Jan. 15, 1992

[30] Foreign Application Priority Data

Jan. 17, 1991 [FR] France ................... 91 00497

[51] Int. Cl.$^5$ ............................ F01B 19/00; F16J 3/00
[52] U.S. Cl. ............................................ 92/47; 92/34; 92/103 M
[58] Field of Search ............... 92/34, 42, 47, 103 M; 74/18, 18.2; 251/61; 285/226; 417/472

[56] References Cited

U.S. PATENT DOCUMENTS

| | | | |
|---|---|---|---|
| 2,303,642 | 12/1942 | Hoy | 92/34 X |
| 3,090,403 | 5/1963 | Kroekel | 92/47 X |
| 3,277,927 | 10/1966 | Schneider | 92/34 X |
| 3,469,502 | 9/1969 | Gardner | 92/34 |
| 3,996,437 | 12/1976 | Selzer | 92/34 X |

FOREIGN PATENT DOCUMENTS

| | | | |
|---|---|---|---|
| 312184 | 4/1989 | European Pat. Off. | |
| 484367 | 7/1917 | France | 285/226 |
| 3726 | 10/1966 | Japan | 92/34 |
| 20863 | 2/1981 | Japan | 92/34 |
| 76362 | 5/1982 | Japan | 92/34 |
| 730858 | 6/1955 | United Kingdom | |

*Primary Examiner*—Edward K. Look
*Assistant Examiner*—John Ryznic
*Attorney, Agent, or Firm*—Finnegan, Henderson, Farabow, Garrett & Dunner

[57] ABSTRACT

The bellows comprise identical waves, having sidewalls in which the elastic deformation of the bellows is located and which have a general curved form in the same axial direction. The bellows can thus be put into a state of elastic axial contraction just sufficient, if the bellows are considered in axial half-section, for each sidewall to be at least approximately contiguous at a single point with the other sidewall of the same wave and at a single point with a sidewall of an adjacent respective wave and for the mean wave peak and wave trough directions respectively to be mutually offset in angle, at least one of them being oblique with respect to the axis of the bellows. The relation between the axis travel of the bellows and its life expectancy is thereby optimized.

13 Claims, 2 Drawing Sheets

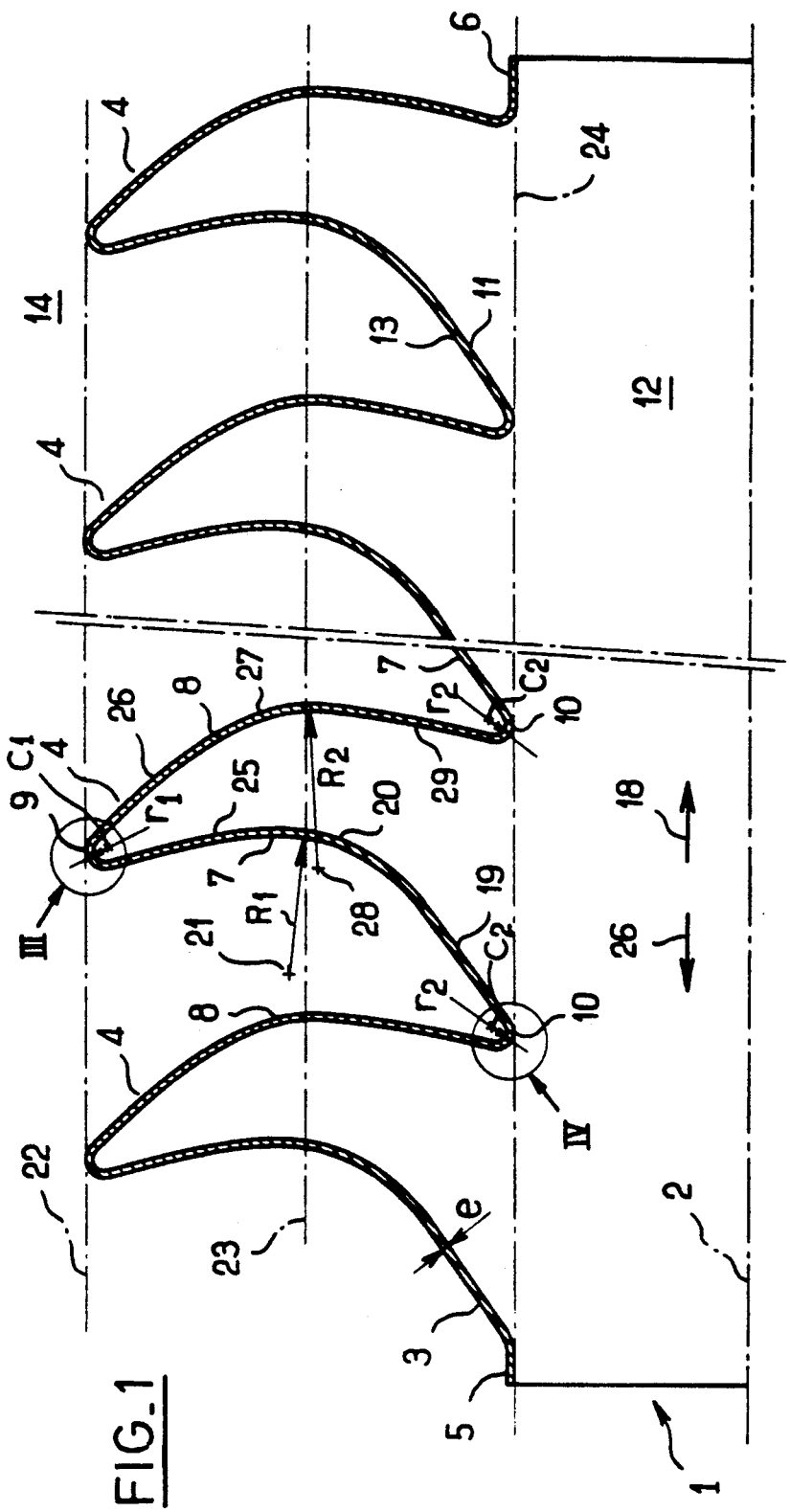

BELLOWS WITH CURVED WAVES HAVING POINTS OF CONTACT

BACKGROUND OF THE INVENTION

The present invention relates to bellows of a type which is elastically extensible and compressible along a defined axis, comprising a wall which is arranged around the axis and which, when it is viewed in section through any half-plane including the axis, comprises a plurality of substantially identical waves which are mutually adjacent parallel to the axis and each of which generally, that is to say with local exceptions especially at the extremities of the bellows, comprises two flexible sidewalls connected together by a comparatively rigid rounded peak, which is convex in the outward direction with respect to the axis, and each of which is connected to a sidewall of a respective adjacent wave by a comparatively rigid rounded trough which is convex in the inward direction with respect to the axis, the bellows being especially capable of taking up a defined state of elastic axial contraction just sufficient for each sidewall to be at least approximately contiguous on the one hand with the other sidewall of the same wave, at a defined point comparatively close to the axis, and on the other hand with a sidewall of a respective adjacent wave, at a defined point comparatively distant from the axis, while defining in proximity to each peak a defined mean peak direction and in immediate proximity to each trough, a defined mean trough direction.

DESCRIPTION OF THE PRIOR ART

Bellows of this type are currently known in a mode of embodiment distinguished by mutual symmetry of the sidewalls of each wave with respect to the mean corresponding peak direction, which is perpendicular to the axis, as are the mean trough directions.

When they are metal, such known bellows lend themselves to fabrication by hydroforming or mechanical forming, then setting to correct length by axial compression in the plastic deformation region, that is to say by techniques which, at the same time, are seen to be favorable in terms of cost price for medium or large scale fabrication, and create, at the levels of the peaks and the troughs, hardening suitable to confer on them the required rigidity, permitting the elastic deformation to which the wall is subjected during extension and compression of the bellows to be limited to the sidewalls.

In applications implying a pressure difference between their interior and the exterior, such as applications in regulation, such known bellows have in addition the advantage of offering a substantially constant effective surface to this pressure difference, within a large range of variation in their axial dimensions in the elastic region, which allows of their application in regulation.

However, these known bellows are of inferior performance, in terms of amplitude in axial elastic extensibility and compressibility or axial elastic travel and in terms of life expectancy,, compared to bellows which have the same bulk at rest, but which are produced by another technique, namely by stacking initially separate, mutually identical, cup-shaped sidewalls, then soldering these sidewalls together alternately in external peripheral areas corresponding to the peaks and in internal peripheral areas corresponding to the troughs. These soldered bellows, on the other hand, have the disadvantage of being much more expensive than the bellows which are hydroformed or mechanically formed, on a large scale, by virtue of the necessarily long time required to carry out the soldering; moreover, they have the disadvantage of offering an essentially variable effective surface to the pressure differences between their interior and the exterior, as a function of their state of axial extension or compression, which prohibits their use in certain applications and especially in regulation.

SUMMARY OF THE INVENTION

The aim of the present invention is to augment the amplitude of axial elastic extensibility and compressibility of the bellows of the type indicated in the preamble without diminishing their life expectancy, and, if possible, also to improve this latter, with an unchanged bulk at rest, this bulk being generally imposed by the conditions of use, or even to reduce the said bulk without diminishing their performance characteristics in terms of amplitude of axial elastic extensibility and compressibility and of life expectancy, in order to permit a reduction in the dimensions of the assemblies with which they have to be integrated.

To this end, the present invention proposes a bellows of the type indicated in the preamble, wherein the sidewalls have a general curved form in the same axial direction so that the mean peak and trough directions respectively are mutually offset in angle and at least one of the mean peak and trough directions respectively is oblique with respect to the axis.

Naturally, such bellows according to the invention preserve the advantages of the bellows of the type indicated in the preamble, especially the possibility of a production by hydroforming or mechanical forming then setting to the correct length by axial compression in the plastic region when they are metal and a substantially constant effective surface offered to the pressure differences within a large range of amplitude of axial elastic extension or compression.

The characteristic form of the waves, and more precisely of the sidewalls of the latter, permit, however, a considerable improvement in the characteristics of axial elastic travel and of life expectancy of the bellows, by permitting the number of waves for a given bulk to be increased, at rest, or even to reduce this bulk for a given number of waves without diminishing the characteristics of axial elastic travel and of life expectancy, by comparison with the bellows currently known, of the type indicated in the preamble.

The characteristic angular offset of the mean peak and trough directions respectively is expressed by the fact that these latter form between them an angle $\alpha$ which is other than 0° and 180°, and in practice satisfies the following relation:

$$45° \leq \alpha < 180°.$$

The value of the angle $\alpha$ may in other respects be chosen at will, but, for preference, this angle $\alpha$ satisfies the following relation:

$$90° \leq \alpha \leq 150°.$$

Inasmuch as at least one of the mean peak and trough directions respectively is oblique with respect to the axis, the other of these mean directions may remain perpendicular to the axis as in the known bellows of the type indicated in the preamble, but it can equally be oblique with respect to the axis and, especially, one currently preferred mode of employment of the invention is distinguished in that the mean peak and trough directions respectively have inclinations which are opposed with respect to the axis.

When such is the case, the above-mentioned angle $\alpha$ is equal to the sum of the angles $\alpha_1$ and $\alpha_2$ which the mean peak direction and the mean trough direction respectively form with the axis and, for preference, these angles $\alpha_1$ and $\alpha_2$ satisfy the following relations:

$$45° \leq \alpha_1 \leq 75°$$

$$45° \leq \alpha_2 \leq 75°.$$

Naturally, other values can be chosen for the angles $\alpha$, $\alpha_1$, $\alpha_2$ without departing in any way from the scope of the present invention, although the above-mentioned values are currently considered as an optimum compromise in terms of axial elastic extension and compression travel of the bellows and of life expectancy of the latter, especially.

Considering bellows according to the invention in the above-mentioned state of elastic axial contraction of compression just sufficient, in a general way, for each sidewall to be at least approximately contiguous on the one hand with the other sidewall of the same wave, at a defined point comparatively close to the axis, and on the other hand with a sidewall of a respective adjacent wave, at a defined point comparatively distant from the axis, and if the distances separating, parallel to the axis, two of these points comparatively distant from the axis and two of these points comparatively close to the axis are designated respectively by $d_1$ and $d_2$, these two distances $d_1$ and $d_2$ are at least approximately equal and satisfy the following relations:

$$d_1 \geq 2(r_1+e)/\sin \alpha_1$$

$$d_2 \geq 2(r_2+e)/\sin \alpha_2$$

where $r_1$ designates the minimum internal radius of a peak, $r_2$ the minimum internal radius of a trough and $e$ the thickness of the tubular wall, that is to say the thickness of a single layer of material comprising the latter or the total thickness of several layers of material which comprise it, as the case may be.

When, as is allowed for reasons of fabrication tolerances or by deliberate choice, the general mutually contiguous character of the two sidewalls of the same wave or of two sidewalls of adjacent waves is only approximate, that is to say when the two relevant sidewalls allow, parallel to the axis, a minimum spacing to remain between them, which is generally less than the thickness of the tubular wall, there is defined:

as distance $d_1$ the greatest dimension which a wave exhibits parallel to the axis, measured at the exterior of this wave between two points which are the closest to the adjacent waves and constitute for each sidewall of the relevant wave a point of approximate contact with a sidewall of an adjacent wave, that is to say the said respective point which is the furthest from the axis, and as distance $d_2$ the greatest dimension which separates, parallel to the axis, two sidewalls mutually connected by a wave trough, measured at the interior of the corresponding respective waves, between two points which, for each relevant sidewall, constitute the point closest to the other sidewall of the same wave, that is to say a point of approximate contact with the other sidewall of the same wave and the said point which is closest to the axis.

It will be noted that the distances $d_1$ and $d_2$ could equally be defined thus when the mutually contiguous character of the two sidewalls of the same wave and the two sidewalls of adjacent waves is strict.

In the abovementioned state of the bellows, the distances $L_1$ and $L_2$ between on the one hand a mid-wave line, defined as a line parallel to the axis and constituting a mid-line between the alignment of the wave peaks and the alignment of the wave troughs, and on the other hand the said points which are comparatively distant from the axis and the said points which are comparatively close to the axis, respectively, are linked to the wave height $H$, defined as the distance separating the respective alignments of the wave peaks and the wave troughs, perpendicular to the axis, by the following relations:

$$L_1 \leq \frac{H}{2} - \frac{(r_1 + e)}{\cos \alpha_1}$$

$$L_2 \leq \frac{H}{2} - \frac{(r_2 + e)}{\cos \alpha_2}$$

The idea of minimum internal radius of a peak or of a trough is understood by reference to a view of the tubular wall of the bellows in section through any half-plane including the axis and designates the minimum radius, at the level of a peak or of a trough respectively, of that one of the faces of the bellows which is concave at the level of this peak or of this trough, respectively, namely the internal face of the bellows in the case of a peak and the external face of the bellows in the case of a trough; the term "minimum" raises the possibility of departing slightly, for the peaks and the troughs, from a form corresponding rigorously to an arc of a circle in order to adopt a form corresponding only approximately to such an arc of a circle; by reason of the rigidity of the tubular wall of the bellows at the level of the peaks and the troughs in the case of bellows according to the invention as in bellows of the type indicated in the preamble, this minimum radius $r_1$ or $r_2$ can be considered to be constant in normal conditions of axial elastic extension or compression of the bellows, and can be defined, for example, by reference to the above-mentioned state, perfectly defined, of elastic axial contraction just sufficient for each sidewall to be at least approximately contiguous at one respective point on the one hand with the other sidewall of the same wave and on the other hand with a sidewall of a respective adjacent wave, in a general way.

It will be noted that the relations above, defining $L_1$ and $L_2$, offer a large range of possible positioning, following radial directions by reference to the axis, that is to say equally on the wave sidewalls, of the points of at least approximate contact between two sidewalls of the same wave and between two sidewalls of respective adjacent waves by an appropriate choice of the respective forms of each sidewall of the waves, falling into the domain of the normal abilities of a person skilled in the art with the aim of enhancing certain characteristics of the bellows, as a function of the utilisation for which the latter is intended.

In particular, $L_1$ can be chosen in such a way as to establish at least approximate contact between the sidewalls of two adjacent respective waves as close as possible to the peaks, in which case:

$$L_1 = \frac{H}{2} - \frac{(r_1 + e)}{\cos \alpha_1}$$

In the same way $L_2$ can be chosen such that:

$$L_2 = \frac{H}{2} - \frac{(r_2 + e)}{\cos \alpha_2}$$

in which case the contact between the two sidewalls of a wave is established at the level of the wave troughs, that is to say as close as possible to the axis.

By a judicious choice of the values $L_1$ and $L_2$, it is thus possible either to reach an optimum compromise between the amplitude of axial elastic extensibility and axial elastic compressibility of the bellows and their life expectancy, by siting the points of at least approximate contact between two sidewalls of the same wave and the points of at least approximate contact between two sidewalls of adjacent respective waves approximately at the same distance from the mid-wave line, this distance being for preference of the order of a quarter of the wave height; it is also possible to enhance the behavior with an external overpressure by arranging that the points of at least approximate contact between the sidewalls of two adjacent respective waves are further from this mid-line than the points of at least approximate contact between the sidewalls of the same wave, or on the other hand to enhance the behavior in internal overpressure by arranging that the points of at least approximate contact between two sidewalls of the same wave are further from this mid-line than the points of at least approximate contact between the sidewalls of two adjacent respective waves.

Naturally, for a defined axial dimension of the bellows, for example at rest or even in the above-mentioned defined state of elastic axial contraction, it is possible to provide as many more waves as the radii $r_1$ and $r_2$, which condition the distances $d_1$ and $d_2$, are small, which optimizes the relationship between the elastic axial travel of the bellows and their life expectancy; moreover, in the case of metal bellows produced by hydroforming or mechanical forming then setting to length by axial compression, small radii $r_1$ and $r_2$ favor the hardening of the troughs and peaks, thus providing their rigidity which permits localization in the sidewalls of the elastic deformation to which the tubular wall of the bellows is subjected by axial extension and compression of the latter.

Thus, the radii $r_1$ and $r_2$, which can be different or equal, have, for preference, values less than 3 times the thickness e of the tubular wall and, when the latter is formed by a single layer of material, are advantageously each equal to this thickness e; when the tubular wall is formed by a superposition of at least two layers, with at least one layer of thickness $e_1$ defining the radius $r_1$ and a layer of thickness $e_2$ defining the radius $r_2$, the thickness e of the tubular wall being then at least equal to the sum of the thicknesses $e_1$ and $e_2$ as a function of the number of layers of which this tubular wall is constituted, the radii $r_1$ and $r_2$ preferably satisfy the following relations:

$r_1 < 3e_1$ $r_2 < 3e_2$ and, for preference:

$r_1 = e_1$ $r_2 = e_2$.

The typical arrangements in the present invention apply more particularly to metal bellows, for example in stainless steel, nickel alloy (such as inconel or monel), titanium, bronze, copper alloy, or any alloy with characteristics which permit it to be easily worked, but other materials could equally be used for the production of bellows according to the invention without departing in any way from the scope of the latter.

The invention will better be understood if reference is had to the description below, relating to a nonlimiting example of production, and to the attached drawings which form an integral part of this description.

BRIEF DESCRIPTION OF THE DRAWINGS

FIG. 1 shows a sectional view, through an axial half-plane, of bellows according to the present invention in the rest state, that is to say in their natural configuration, in the absence of any loading.

FIGS. 3 and 4 show, on a larger scale, details denoted respectively as III and IV in FIG. 1, in the case of one variant of embodiment of the wall of the bellows.

DESCRIPTION OF THE PREFERRED EMBODIMENT

Figure 2:
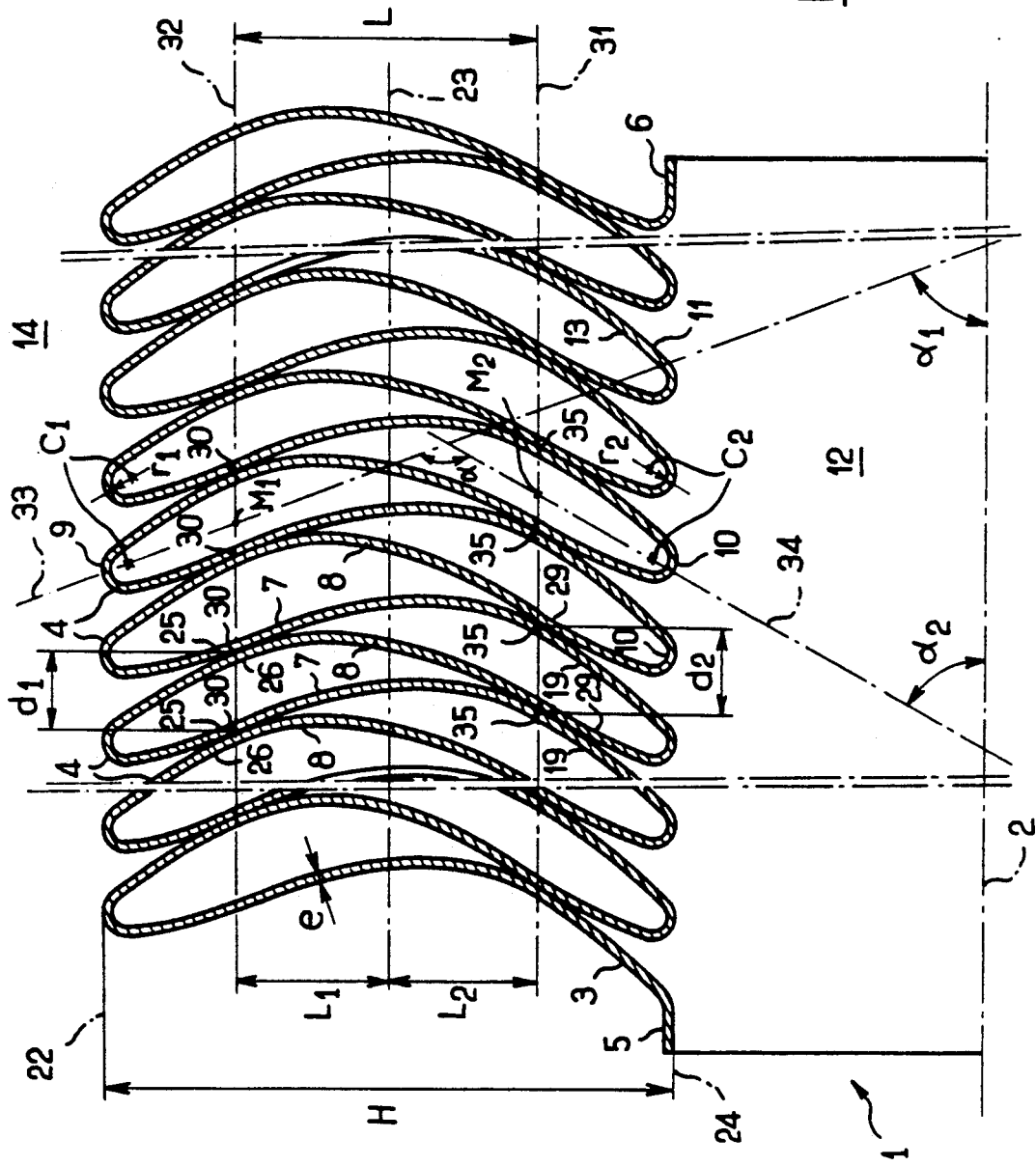
FIG. 2 shows a view of these bellows in section through the same axial half-plane, the bellows however occupying a state of axial elastic contraction or compression just sufficient, when they are seen along such a section, for the two sidewalls of each wave to be mutually contiguous at a single point, comparatively close to the axis of the bellows, and for each of them to be contiguous with the sidewall of an adjacent respective wave at a single respective point, comparatively more distant from the axis of the bellows; this state is generally defined as a state in which all the waves, except one, are contiguous.

The bellows 1 illustrated in FIGS. 1 and 2 have a rectilinear axis 2 and are composed of a tubular wall 3 for example made of metal, coaxially surrounding this axis 2 and formed, for example by hydroforming or mechanical forming then axial compression in the plastic region, in such a way as to exhibit a plurality of waves 4 which are mutually identical and mutually adjacent in the axial direction, between two end sections 5 and 6 for example cylinders of revolution around the axis 2, and intended to permit the integral connection of the bellows between pieces which are axially movable with respect to each other and between which the bellows 1 are for example intended to form a leak-tight seal; the waves 4 can exhibit annular respective forms surrounding the axis 2, when the said pieces are intended only to undertake relative axial displacements or even movements which impose on the bellows 1 flexing or mutual lateral offset of its two end sections 5 and 6, whereas they can be constituted by respective spirals of a helix when these pieces can be additionally made to undertake relative rotation movements around the axis 2, as is known to the person skilled in the art.

Each wave 4 comprises two flexible sidewalls 7, 8, in which the elastic deformation of the wall 3 is localized during movements in elastic axial extension or compression of the bellows 1. To this end, the two sidewalls 7, 8 of each wave 4 are mutually connected, in the outward direction with respect to the axis 2, by a wave peak 9 which is substantially rigid in the normal conditions of use of the bellows 1, that is to say in the elastic axial deformation region of the latter; in addition, each of the sidewalls 7, 8 of a wave 4 is linked to a sidewall of a respective adjacent wave 4, namely respectively the sidewall 8 of this adjacent area as far as the sidewall 7 of the relevant wave is concerned and the sidewall 7 of this adjacent wave as far as the sidewall 8 of the relevant wave is concerned, in the inward direction with respect to the axis 2, by a wave trough 10, which is also rigid in the said normal conditions of use of the bellows 1.

Such rigidity of the peaks 9 and troughs 10 is advantageously obtained by the hardening resulting from the hydroforming or from the mechanical forming then the setting to length as has been indicated above and, in a sectional view through an axial half-plane as is shown in FIGS. 1 and 2, each peak 9 and each trough 10 exhibit a convex arched form respectively in the outward direction with respect to the axis 2 and in the inward direction with respect to the latter; more precisely, in such a sectional view, the face 11 of the wall 3 which is turned towards the interior 12 of the bellows 1 exhibits at the interior of each wave peak 9, at least approximately, the form of an arc of a circle of radius r, and of center $C_1$ while the face 13 of the wall 3 which is turned towards the exterior 14 of the bellows 1 exhibits at the interior of each wave trough 10, at least approximately, the form of an arc of a circle of radius $r_2$ and of center $C_2$, these forms and these radii $r_1$ and $r_2$ being substantially preserved whatever the state of elastic axial contraction or extension of the bellows 1 in the normal conditions of use of the latter; when, as is allowed, the faces 11 and 13 exhibit a form which is slightly different from that of an arc of a circle, respectively at the interior of a wave peak 9 and at the interior of a wave trough 10, when the bellows are seen in section through an axial half-plane as is the case in FIGS. 1 and 2, the minimum radius of curvature of the face 11 at the interior of each wave peak 9 and the minimum radius of curvature of the face 13 at the interior of each wave trough 10, respectively are adopted as radius $r_1$ and $r_2$.

The radii $r_1$ and $r_2$ are, for preference, chosen to be as small as possible, especially for consistency with a hardening of the wave peaks 9 and wave troughs 10 when the wall 3 is metal and formed by hydroforming or mechanical forming then setting to length by axial compression as has been indicated above. Thus, for preference, they are less than three times the substantially constant thickness e of the wall 3, and for example equal to this thickness e when, as is illustrated in FIGS. 1 and 2, the wall 3 is formed by a single layer of material such as a metal or a metal alloy; when, as in the diagram in FIGS. 3 and 4, the wall 3 is formed by a superposition of at least two layers whose combined, substantially constant, thicknesses define its thickness e, and for example by three layers 15, 16, 17, the radius $r_1$ is, for preference, less than three times the thickness $e_1$ of the layer 15 which constitutes the face 11 turned towards the interior 12 of the bellows 1, and, for example, substantially equal to this thickness $e_1$, while the radius $r_2$ is, for preference, less than three times the thickness $e_2$ of the layer 17 which constitutes the face 13 turned towards the exterior 14 of the bellows, and, for example, substantially equal to this thickness $e_2$. Needless to say, different choices would not, however, depart from the scope of the present invention.

Equally, the sidewalls 7 and 8 of each wave 4 can exhibit various forms without departing in any way from the scope of the present invention, but, in a characteristic way, they exhibit a curved form turned in a single axial direction 18, going, in the example illustrated, from the end section 5 towards the end section 6, so that each wave 4 no longer exhibits symmetry with respect to a respective plane perpendicular to the axis 2, characteristic of the bellows of the prior art of the type capable of taking up a preferred state of axial compression just sufficient for the two sidewalls of a wave to be in mutual contact at a single point comparatively close to the axis and in contact with one sidewall of an adjacent respective wave at a single point comparatively distant from the axis, reference being made to a view of the bellows in section through an axial plane or half-plane.

By way of nonlimiting example and if reference is made to the sectional view in FIG. 1, each sidewall 7 exhibits, going away from each wave trough 10, successively:

an approximately straight section 19 connecting without a sharp bend to the wave trough 10 and extending from the axis 2 in the direction 18;

a section 20 approximately in an arc of a circle convex in the direction 18, connecting without a sharp bend to the straight section 19 and centered at a point 21 situated between the alignment 22 of the wave peaks 9 parallel to the axis 2 and a mid-wave line 23, defined as a line parallel to the axis 2, situated between the above-mentioned alignment 22 and the alignment 24 of the wave troughs 10 parallel to the axis 2, the line 23 being equidistant from these two alignments 22 and 24; the alignments 22 and 24 are themselves both defined as being tangent respectively to the face 13 of the wall 3 at the level of the wave peaks 9 and to the face 11 of the wall 3 at the level of the wave troughs 10;

an approximately straight section 25 connecting without a sharp bend to the section 20 and extending from the axis 2 in the direction 26 opposite to the direction 18 to connect without a sharp bend, in the outward direction with respect to the axis 2, to the wave peak 9.

Each wave sidewall 8 itself exhibits successively, going away from a wave peak 9, in this nonlimiting example:

an approximately straight section 26 connecting without a sharp bend to the wave peak 9 and approaching the axis in the direction 18;

a section 27 approximately in an arc of a circle convex in the direction 18, connecting without a sharp bend to the section 26 and centered at a point 28 situated between the mid-line 23 and the alignment 24;

an approximately straight section 29 connecting without a sharp bend to the section 27 and to a wave trough 10, this section 29 approaching the axis 2 in the direction 26 opposite to the direction 18.

The radii $R_1$ and $R_2$, respectively of the face 13 of the wall 3 at the level of the section 20 of a sidewall 7, by reference to the point 21, and of the face 11 of the wall 3 at the level of the section 27 of a sidewall 8, by reference to the point 28, are very much greater than the radii $r_1$ and $r_2$.

This form of the two sidewalls 7 and 8 of each wave 4, or of other forms easily determinable by a person skilled in the art, permits the wall 3 of the bellows 1 to be deformed in axial elastic compression or extension over a large useful amplitude, while preserving a substantially constant value for the wave height defined as the spacing H, radial by reference to the axis 2, between the two alignments 22 and 24, which permits the bellows 1 to offer an effective cross section which is also substantially constant during pressure differences which are capable of being exercised between the interior 12 and exterior 14 of the bellows 1, and especially permits the use of the latter in regulation; however, other configurations, giving rise to a variation in this spacing or wave height H, could be adopted without departing in any way from the scope of the present invention.

When the bellows 1 are at rest, as is shown in FIG. 1, that is to say in the absence of any loading, their waves 4 are mutually separated so that from this rest state, the bellows can undergo axial elastic extension as well as axial elastic compression.

By axial elastic compression, the bellows can especially be brought to the preferred state illustrated in FIG. 2, in which, by virtue of the configuration described of the sidewalls 7 and 8 of each wave 4 or of other configurations chosen by the person skilled in the art to this end and if reference is made to a section through an axial half-plane, the two sidewalls 7 and 8 of each wave 4 are mutually contiguous, through the face 11 of the wall 3, at a single point 35 situated between the midline 23 and the alignment 24 while each of these sidewalls 7, 8 of a wave 4 is contiguous with the sidewall 8, 7, respectively, of an adjacent respective wave 4 at one respective point 30 itself situated between the mid-line 23 and the alignment 22, the different points 35 exhibiting an alignment 31 which is parallel to the axis 2 while the points 30 exhibit an alignment 32 which is also parallel to this axis 2, perpendicular to which the two alignments 31 and 32 are mutually distant by a distance L corresponding to the sum of the distances $L_1$ and $L_2$ separating the alignments 32 and 31 respectively from the mid-line 23. It could also be allowed, in a way which is not illustrated, that either the two sidewalls 7, 8 of each wave 4 or of certain waves 4, or all or part of the sidewalls 7, 8 of mutually adjacent waves 4 connected by a wave trough 10, are not strictly contiguous but leave, parallel to the axis 2, a minimum spacing which is generally less than the thickness of the wall 3, between respective points of approximate mutual contact, corresponding respectively to the points 35, which are then split into two, or to the points 30, which are then split into two, and defining on each sidewall 7, 8 respectively the point on this sidewall which is closest, parallel to the axis 2 of the bellows, to the other sidewall of the same wave 4 or the point of this sidewall which is closest, parallel to the axis 2 of the bellows, to the sidewall of an adjacent wave to which it is connected by a wave trough 10.

Parallel to the axis 2, two adjacent points 30 and two adjacent points 35 are spaced by identical distances, respectively $d_1$ and $d_2$ which, like the distances $L_1$ and $L_2$, vary according to the form of the sidewalls 7 and 8, which is distinguished in particular by the mean direction 33 which each wave 4 exhibits in immediate proximity to its peak 9 and the mean direction 34 which two adjacent waves 4 define in immediate proximity to the corresponding wave trough 10, and more precisely by angles $\alpha_1$ and $\alpha_2$ formed by these mean directions 33 and 34 respectively with respect to the axis 2, account being taken of their orientation with respect to the latter, reference being made to FIG. 2 and to the state of axial compression of the bellows 1 illustrated in this Figure.

The mean direction 33 of a wave peak 9 is defined as a direction passing through the corresponding center $C_1$ and through the corresponding midpoint $M_1$ between the two points 30 to the two sidewalls 7, 8 of the same wave 4, and the mean direction 34 of a wave trough 10 as a direction passing through the corresponding center $C_2$ and through the corresponding midpoint $M_2$ between the two points 35 to the two sidewalls 7, 8 mutually connected by this wave trough 10.

The form chosen for the sidewalls 7 and 8 in the example illustrated results in giving the mean directions 33 and 34 inclinations which are opposed with respect to the axis 2, it being understood that other forms of sidewalls 7 and 8 suitable for producing a mutual angular offset of these directions 33 and 34 in the preferred state of axial compression corresponding to the state illustrated in FIG. 2 could be chosen without departing in any way from the scope of the present invention, which can be expressed by the fact that the mean directions 33 and 34 form between them an angle $\alpha$ which is equal to or greater than 45° and less than 180° in a state of axial compression of the bellows corresponding to the state illustrated in FIG. 2.

For preference, this angle $\alpha$ lies between 90° and 150°, or is equal to one or other of these values, while other choices do not depart from the scope of the present invention.

In the example illustrated, the angle $\alpha$ is equal to the sum of the angles $\alpha_1$ and $\alpha_2$, each of them being less than 90° and greater than 0°, and each of these angles $\alpha_1$ and $\alpha_2$ preferably lies between 45° and 75°, or is equal to one or the other of these values, it being understood that other choices would not depart from the scope of the present invention; in particular one of the angles $\alpha_1$ and $\alpha_2$ could be equal to 90°, the other of these angles then being for its part different from 90° so as to be consistent with an angular offset of the mean directions 33 and 34.

It is easily demonstrated that for defined values of e, $r_1$, $r_2$, $\alpha_1$ and $\alpha_2$, the distances $d_1$ and $d_2$, equal to each other in the example illustrated in which the sidewalls 7, 8 of the same wave 4 are strictly contiguous as also are those of the sidewalls 7, 8 of two adjacent waves 4 which are connected together by a wave trough 10, and the distances $L_1$ and $L_2$ satisfy the following relations:

$$d_1 \geq 2(r_1+e)/\sin \alpha_1$$

$$d_2 \geq 2(r_2+e)/\sin \alpha_2$$

$$L_1 \leq \frac{H}{2} - \frac{(r_1 + e)}{\cos \alpha_1}$$

$$L_2 \leq \frac{H}{2} - \frac{(r_2 + e)}{\cos \alpha_2}$$

If $d_1$ is equal to $2(r_1+e)/\sin \alpha_1$ and if $L_1$ is equal to $$\frac{H}{2} - \frac{(r_1 + e)}{\cos \alpha_1}$$

in a way which is not illustrated, sidewalls 7, 8 of adjacent respective waves 4 are in a general way, that is to say with the exception of the sidewalls 7 and 8 adjoining the end sections 5 and 6, in mutual contact by points 30 located at the level of the wave peaks 9; in the same way, if $d_2$ is equal to $2(r_2+e)/\sin a_2$ and if $L_2$ is equal to $$\frac{H}{2} - \frac{(r_2+e)}{\cos a_2},$$

the contact between the two sidewalls 7 and 8 of a wave 4 is established, in a way which is not illustrated, at a point 35 located at the level of the corresponding wave troughs 10.

Outside these conditions, the points 30 are situated at the level of the sections 25 and 26, then deformed, of the sidewalls 7 and 8 respectively while the points 35 are situated at the level of the sections 19 and 29, then also deformed, of the sidewalls 7 and 8 respectively.

When, in a way which is not illustrated, the contact between the sidewalls of the same wave or between two adjacent wave sidewalls is only approximate, the distances $d_1$ and $d_2$ may be only approximately equal but they nevertheless satisfy the relations above, the distance $d_1$ being defined as the distance separating parallel to the axis the two points of at least approximate contact of the sidewalls of this wave with the adjacent wave sidewalls and the distance $d_2$ as the distance separating parallel to the axis the two points of at least approximate contact of two sidewalls belonging to two adjacent waves, mutually connected by a wave trough 10, with the other sidewall of the corresponding respective wave.

The distances $d_1$ and $d_2$ thus correspond respectively to the greatest dimension which a wave 4 exhibits parallel to the axis 2 at the level of its sidewalls 7 and 8 and to the greatest dimension which separates, parallel to the axis 2, those of the sidewalls 7, 8 of two adjacent waves 4 which are connected together by a wave trough 10.

The distances $L_1$ and $L_2$ then also satisfy the relations above.

Tests have demonstrated that by varying the distances $L_1$ and $L_2$, by an appropriate choice of the form of wave sidewalls 7 and 8, the behavior of the bellows 1 can be influenced in use.

Thus, the tests have demonstrated that the choice for $L_1$ and $L_2$ of identical values, approximately equal to a quarter of the wave height H, permitted optimization of the relation between the life expectancy of the bellows and the elastic axial travel admissible for the latter in normal conditions of use, that is to say the difference between its axial dimensions respectively in maximum axial extension and in maximum axial compression in normal conditions of use; the tests have moreover revealed that the choice for $L_1$ of a value greater than that of $L_2$ permits favoring the behavior of the bellows 1 with an external overpressure while the choice for $L_1$ of a value less than that of $L_2$ permits favoring the behavior of the bellows with an internal overpressure, for the same value of the sum L of these two distances $L_1$ and $L_2$.

Also by way of indication, the tests carried out on the metal bellows of the type illustrated in FIGS. 1 and 2 have revealed, by comparison with standard-type bellows of the type indicated in the preamble and of the same bulk, an elastic axial travel greater than 50%, the ratio between the axial dimensions of the bellows respectively in maximum extension and in maximum compression in normal conditions of use lying between 2 and 4.5, a stiffness reduced by 25% and resistance to the pressure differences between the interior and the exterior increased by 30%. These figures which constitute only nonlimiting examples, have been obtained as a result of tests performed on bellows produced by hydroforming of single-layer tubes in various metal alloys exhibiting rates of extension greater than 50%, with thicknesses e lying between 5/100 mm and 0.3 mm, it being understood that different and especially greater thicknesses, reaching for example 4 mm, and different extension rates can, however, be chosen as a function especially of the radial dimensions of the bellows and the conditions of use of the latter.

In a general way, the embodiment of the invention which has just been described constitutes only a nonlimiting example, with respect to which it is possible to foresee numerous variants without departing in any way from the scope of the present invention.

We claim:

1. Bellows of a type which is elastically extensible and compressible along a defined axis, comprising a wall which is arranged around the axis and which, when it is viewed in section through any half-plane including the axis, comprises a plurality of substantially identical waves which are mutually adjacent parallel to the axis and each of which generally comprises two flexible sidewalls connected together at a peak and each of which is connected to a sidewall of a respective adjacent wave at a trough, the bellows being capable of taking up a defined state of elastic axial contraction sufficient for each sidewall to make continuous contact with the other sidewall of the same wave at at least one point comparatively close to the axis, and to make discontinuous contact with a sidewall of an adjacent wave at at least one point comparatively distant from the axis, while defining in proximity to each peak a defined mean peak direction and in immediate proximity to each trough, a defined mean trough direction, wherein the sidewalls have a general curved shape in the same axial direction so that the mean peak and trough directions are mutually offset in angle and at least one of the mean peak and trough directions is oblique with respect to the axis.

2. The bellows as claimed in claim 1, wherein:

$$90° \leq a \leq 150°$$

when said bellows is in said defined state of elastic axial contraction where $a$: angle which the mean peak and trough directions form between them.

3. The bellows as claimed in claim 1, wherein the mean peak and trough directions respectively have inclinations which are opposite with respect to the axis.

4. The bellows as claimed in claim 1, wherein the mean peak and trough directions respectively have inclinations which are opposite with respect to the axis and:

$$90° \leq a \leq 150°$$

$$a = a_1 + a_2$$

$$45° \leq a_1 \leq 75°$$

$$45° \leq a_2 \leq 75°$$

where $a$ = angle which the mean peak and trough directions form between them, $\alpha_1$ = angle which the mean peak direction forms with the axis,
$\alpha_2$ = angle which the mean trough direction forms with the axis.

5. The bellows as claimed in claim 1, wherein:

$$d_1 \geq 2(r_1+e)/\sin \alpha_1$$

$$d_2 \geq 2(r_2+3)/\sin \alpha_2$$

$$d_1 = d_2$$

where $d_1$ = distance separating, parallel to the axis, two of the said points comparatively distant from the axis;
$d_2$ = distance separating, parallel to the axis, two of the said points comparatively close to the axis;
$r_1$ = minimal internal radius of a peak;
$r_2$ = minimal internal radius of a trough;
$e$ = thickness of the tubular wall.

6. The bellows as claimed in claim 1, wherein;

$$L_1 \leq \frac{H}{2} - \frac{(r_1+e)}{\cos \alpha_1}$$

$$L_2 \leq \frac{H}{2} - \frac{(r_2+e)}{\cos \alpha_2}$$

where $L_1$ = distance between the points comparatively distant from the axis and a mid-wave line;
$r_1$ = minimum internal radius of a peak;
$r_2$ = minimum internal radius of a trough;
$L_2$ = distance between the points comparatively close to the axis and the mid-wave line, parallel to the axis;
$e$ = thickness of the tubular wall;
$H$ = wave height, perpendicular to the axis.

7. The bellows as claimed in claim 1, wherein:

$$r_1 > 3e$$

$$r_2 > 3e$$

where $r_1$ = minimum internal radius of a peak;
$r_2$ = minimum internal radius of a trough;
$e$ = thickness of the tubular wall.

8. The bellows as claimed in claim 7, wherein the tubular wall is formed by a single layer and wherein;

$$r_1 = r_2 = e.$$

9. The bellows as claimed in claim 7, wherein the tubular wall is formed by a superposition of at least two layers and wherein:

$$e_1 + e_2 \leq e$$

$$r_1 < 3e_1$$

$$r_2 < 3e_2$$

where $e_1$ = thickness of the layer defining the radius $r_1$
$e_2$ = thickness of the layer defining the radius $r_2$.

10. The bellows as claimed in claim 9, wherein:

$$r_1 = e_1$$

$$r_2 = e_2.$$

11. The bellows as claimed in claim 1, wherein the tubular wall is metal.

12. A bellows as claimed in claim 1 wherein each pair of adjacent flexible sidewalls are connected together by a comparatively rigid rounded peak, which is convex in the outward direction with regard to the axis.

13. A bellows as claimed in claim 1 wherein each of said flexible sidewalls are connected to a sidewall of a respective adjacent wave by a comparatively rigid rounded trough which is convex in the inward direction with respect to the axis.

* * * * *

UNITED STATES PATENT AND TRADEMARK OFFICE
CERTIFICATE OF CORRECTION

PATENT NO. : 5,261,319

DATED : November 16, 1993

INVENTOR(S) : Laville et al.

It is certified that error appears in the above-identified patent and that said Letters Patent is hereby corrected as shown below:

Claim 1, col. 12, line 30, delete "continuous" and insert --discontinuous--.

Signed and Sealed this

Seventeenth Day of January, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,261,319
DATED : November 16, 1993
INVENTOR(S) : LAVILLE ET AL.

It is certified that error appears in the above-indentified patent and that said Letters Patent is hereby corrected as shown below:

Col. 4, line 21, change "$\dfrac{(r_1 + e)}{\cos \alpha_1}$" to --$(r_1 + e)(\cos \alpha_1 + 1)$--; and line 23, change "$\dfrac{(r_2 + e)}{\cos \alpha_2}$" to --$(r_2 + e)(\cos \alpha_2 + 1)$--.

Col. 5, line 5, change "$\dfrac{(r_1 + e)}{\cos \alpha_1}$" to --$(r_1 + e)(\cos \alpha_1 + 1)$--; and line 9, change "$\dfrac{(r_2 + e)}{\cos \alpha_2}$" to --$(r_2 + e)(\cos \alpha_2 + 1)$--.

Col. 10, line 53, change "$\dfrac{(r_1 + e)}{\cos \alpha_1}$" to --$(r_1 + e)(\cos \alpha_1 + 1)$--;

line 54, change "$\dfrac{(r_2 + e)}{\cos \alpha_2}$" to --$(r_2 + e)(\cos \alpha_2 + 1)$--; and line 61, change "$\dfrac{(r_1 + e)}{\cos \alpha_1}$" to --$(r_1 + e)(\cos \alpha_1 + 1)$--.

Col. 11, line 5, change "$\dfrac{(r_2 + e)}{\cos \alpha_2}$" to --$(r_2 + e)(\cos \alpha_2 + 1)$--.

UNITED STATES PATENT AND TRADEMARK OFFICE
CERTIFICATE OF CORRECTION

PATENT NO. : 5,261,319
DATED : November 16, 1993
INVENTOR(S) : LAVILLE ET AL.

It is certified that error appears in the above-indentified patent and that said Letters Patent is hereby corrected as shown below:

Claim 6, col. 13, line 23, change "$\frac{(r_1 + e)}{\cos \alpha_1}$" to --$(r_1 + e)(\cos \alpha_1 + 1)$--; and line 26, change "$\frac{(r_2 + e)}{\cos \alpha_2}$" to --$(r_2 + e)(\cos \alpha_2 + 1)$--.

Signed and Sealed this

Fifth Day of September, 1995

Attest:

BRUCE LEHMAN

Attesting Officer

Commissioner of Patents and Trademarks